3,200,664
STOP FOR LINEAR ACTUATORS
Gerhard Mauric, Los Angeles, Calif., assignor to Electronic Specialty Co., Los Angeles, Calif., a corporation of California
Filed Oct. 16, 1963, Ser. No. 316,612
18 Claims. (Cl. 74—424.8)

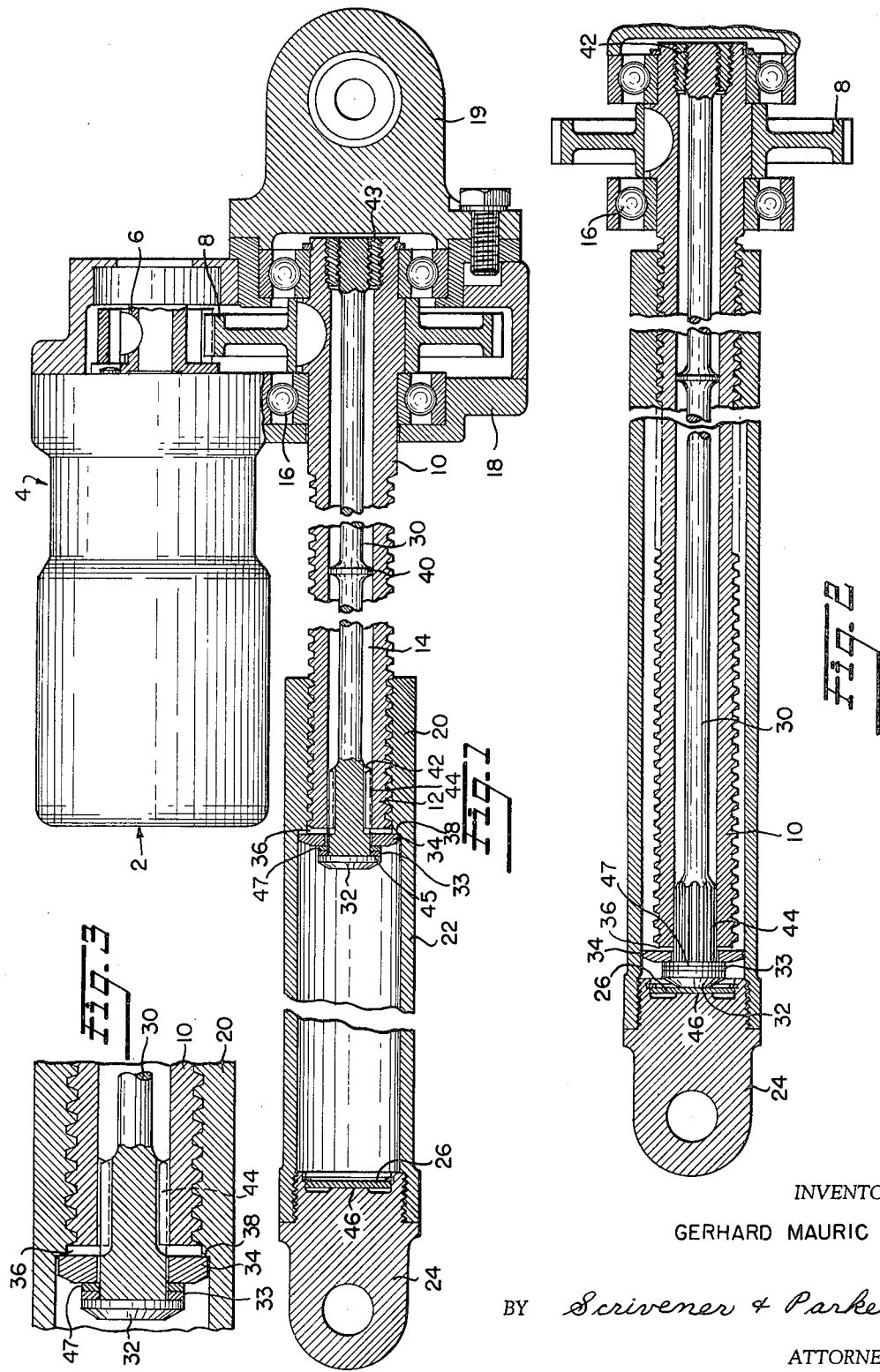

This invention relates broadly to devices, such as motor driven actuators, for translating rotary into linear motion and, more particularly, to means incorporated in such devices, for reducing the forces which are produced by impact at either of the extreme limits of movement of the device and which may cause the relatively moving parts to jam.

Various types of parts and members must be operated to off-and-on or extended-retracted positions or to intermediate positions, an example being an aircraft control surface such as an aileron or high lift flap, and one apparatus which is very widely used to effect such operation comprises a screw and nut device, one element of which is rotated by an electric motor while the other element is attached to the operated part or member for lineal non-rotating movement. Such an apparatus not only permits two-way operation but also permits close control to effect movement to any desired intermediate point. Such devices are usually controlled at a remote location such as the control and operating area of an aircraft by switches which operate to prevent parts moving relatively to each other to impact at the limit of movement. In some instances these switches can fail and in still other applications they are omitted to simplify the system.

The forces produced by the impact of the relatively rotating members at the limit of relative movement thereof are the result of the kinetic energy of the moving parts of the actuator being suddenly expended against an end stop, and the magnitude of these forces is inversely proportional to the time required to bring the moving parts to standstill after contacting the end stop. When this time is very short, as on solid impact, the forces may be very high and component parts may break or jam, by which latter term is meant a condition in which the relatively movable and rotating parts are locked together and the force required to separate them and move the linearly movable part in the opposite direction is greater than the capability of the actuator.

The present invention relates to actuators of the described type and (without the use of the present invention) having the described tendency to jam at either limit of travel of the linearly movable element, and has for its principal object the provision of means for reducing to a minimum the forces resulting from the impact of the rotating and linearly moving members at either limit of movement thereof. Other devices and means having this same general objective are known and in wide use, which devices and means have been intended and designed to store the kinetic energy of impact as potential energy in torsion only, or in torsion and compression at the limit of movement, thereby increasing the time between impact and standstill and limiting the forces to safe values.

The present invention departs from these known energy absorbing means and makes use of the known fact that the energy that can be stored elastically in a straight bar when loaded in tension or compression only is more than twice the energy that can be stored in the same bar when loaded in torsion only, and is in any case greater than the energy that can be stored in the same bar when loaded in any combination of torsion with compression or tension. The relative amount of storable energy depends in the latter case on the relative amount of torsion and compression or tension. The invention therefore provides means which are loaded in either compression only or tension only by the forces of impact between the relatively rotating members, depending on the direction of movement of the linearly moving member. These means provided by the invention therefore provide maximum energy storage capacity, thus increasing to a maximum the time interval between impact and standstill. The resulting reduction of impact forces reduces the tendency of the parts to jam.

The invention is described in the following specification and is illustrated in the accompanying drawing, in which:

FIG. 1 is a view which is partly in section and partly in elevation and which shows a motor operated extensible strut or actuator of the type to which the invention relates, including the energy absorbing means provided by the invention, the parts being shown with the strut in its most extended position;

FIG. 2 is a view showing parts illustrated in FIG. 1 in the most retracted position of the strut;

FIG. 3 is an enlarged sectional view of parts shown in the other figures, illustrating particularly the outboard end of the jack-shaft and cushion rod and the connection between them.

Figure 4:
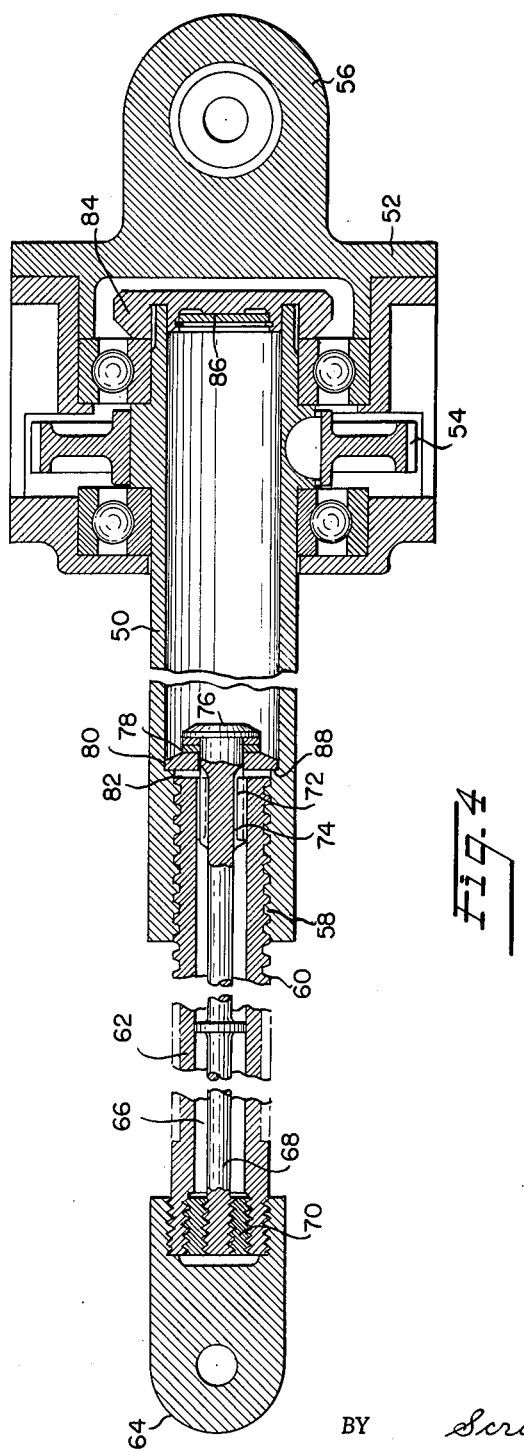
FIG. 4 is a view which is similar to FIG. 1 but shows a second embodiment of the invention.

An actuator of the extensible strut type to which the invention relates is disclosed in the drawings and comprises an electric motor or other prime mover 2, the armature shaft of which is connected through reduction gearing 4 to a pinion 6 which is in mesh with a gear 8 which is keyed to the inner end of a jack-shaft 10 which is externally threaded from its outer end 12 to a point adjacent but spaced from its inner end, and which is hollow or provided with an internal bore 14. Bearings 16 are provided to support the jack-shaft in a housing 18 which encloses the reduction gearing and other parts of the actuator and which carries an eye piece 19 by which the housing and its associated parts may be supported on a fixed part such as the frame of an aircraft. An internally threaded tubular nut 20 is mounted on the threaded part of the jack-shaft and has an elongated hollow strut part 22 extending outwardly therefrom and carrying at its outer end an eye piece 24 for attachment to a part to be operated, such as an aileron, other aircraft control surface or the like. An abutment member 26 is preferably loosely mounted on the inner face of the eye piece 24 within the strut 22. It will be apparent that upon rotation of the motor 2 and jack-shaft 10 in either direction the nut 20 and its connected parts will be moved in extending or retracting direction to operate the connected control surface or other part, and that if such linear movement is continued the nut will engage any solid limit stop with considerable impact, which may cause a jam to occur between the rotation and linearly moving parts.

Means are provided by the invention for producing maximum reduction of the forces resulting from such impact at either of the limits of linear movement of the nut and associated parts along the rotating jack-shaft, thus preventing or reducing to a minimum the tendency to jam. In accordance with the invention these means absorb the kinetic energy of the moving parts and store it elastically in either tension or compression, depending on the direction of linear movement, but are so constructed and related to other parts that no kinetic energy is stored in torsion. The means so provided by the invention comprise a resilient member in the form of an elongated bar or rod 30 which is mounted centrally within the internal bore 14 in the jack-shaft and extends longitudinally along the jack-shaft from the inboard end to the outboard end thereof, and at the outboard end of the jack-shaft extends outwardly thereof and has an abutment member 32 attached to, or formed on, its outer end which engages the abutment member 26 on the eye piece 24 at the limit of movement of the strut 22 in retracted direction. Between the abutment member 32 and the end of the jack-shaft there is mounted on the end of the jack-shaft a movable member 34 which is of larger diameter than abutment 32 and the inner face of which is normally spaced outwardly a small distance, which is shown at 36, from the outer end of the jack-shaft. This member 34 is freely movable rotationally on the jack-shaft and is also freely movable longitudinally thereof within the space 36, and this member is separated from abutment 32 by washers 33 formed of material having a low coefficient of friction. At the limit of extended movement of the strut with respect to the jack-shaft the abutment member 34 engages an annular radial stop surface 38 which is formed internally of the the nut 20 and defines the outboard end of the threaded part of the nut. Intermediate its ends the rod 30 may be supported in the bore of the jack-shaft by an enlarged portion 40 of the rod which engages the wall of the bore in the jack-shaft. The bar 30 is preferably a high tensile strength steel bar with reduced diameter for the active part of its length. For maximum energy storage this diameter is such that at maximum force the maximum safe tensile strength for the material of the bar will be obtained.

In accordance with the invention the outboard end of the rod 30 is secured against any turning movement with respect to the jack-shaft by means which permit only axial movement of the rod longitudinally of the jack-shaft, such means in the disclosed embodiment of the invention being the interengaging splines 42, 44 which are preferably formed, respectively, on the exterior surface of the rod at the outboard end thereof and on the wall of the bore 14 at or adjacent the outboard end of the jack-shaft, although the splines might be positioned at other locations along the length of the rod and jack-shaft. The inner, or inboard end of the rod 30 is secured to the jack-shaft 10 by means which prevent axial movement of the rod with respect to the jack-shaft. In the disclosed embodiment of the invention these securing means comprise a bushing 43 surrounding the end part of the rod and internally screw threaded to the outer surface of the rod and externally screw threaded to a bore within the end of the jack-shaft, but other means could be used for this purpose.

In accordance with the invention parts of the described device are so constructed that forces tending to create torsional stresses in any of the parts are reduced to a minimum. Thus, the abutment member 26 is mounted on eye piece 24 for free turning movement, and the abutment member 32 on the end of the cushion rod is made of the smallest diameter consistent with its function of holding washers 33 and abutment member 34 on the rod. Torsional stresses are further reduced by interposing multiple sliding surfaces between relatively rotating parts which come together. Thus, the two surfaces of rotatably or loosely mounted abutment member 26 interpose two sliding surfaces between abutment 32 and the inner surface 46 of the eye piece, and washers 33 and abutment 34 interpose four sliding surfaces between stop surface 38 and abutment 32.

While in this specification the invention has been described in connection with an actuator having a rotatable jackshaft in which is mounted the cushion bar provided by the invention, and a non-rotatable strut or nut, the invention is equally useful with, and applicable to, an actuator having a non-rotatable jack-shaft in which is mounted the cushion bar provided by the invention, and a rotatable strut or nut, in which actuator linear movement is imparted to the jack-shaft which, in turn, is connected to a part, such as an aileron, which is to be operated by the actuator.

An actuator in accordance with this second embodiment of the invention is disclosed in FIG. 4 and comprises a rotatable nut 50 having its inner end supported in a casing 52 where rotation is imparted to it by gearing 54. The casing has the usual eye piece 56 for attachment to a relatively fixed part such as the fuselage of an airplane. The nut 50 is provided with an internal bore throughout its length and at its outer end is provided with internal screw threads 58 which are in threaded engagement with the external screw threads 60 on a strut 62 which is provided at its outer end with an eye piece 64 for attachment to a relatively movable part such as the aileron of an aircraft. The strut 62 is provided with an internal bore and within this bore there is mounted an elongated cushion rod 68 which at its outboard end is connected to the strut by a nut 70 which prevents any longitudinal movement of the cushion bar. At its other, or inboard end the cushion bar is provided with external splines 72 which interengage with splines 74 which are formed on the wall of the bore 66 at or adjacent the inner end of the strut 62, which is the end within the bore of the nut 50. At its inner end, within the bore in nut 50, the end of the cushion bar protrudes from the end of the strut 62 and is provided with an end enlargement 76, washers 78 and a second abutment 80, all of which correspond in structure, arrangement and function to the members 32, 33, 34 on the end of cushion bar 30 in the embodiment of the invention disclosed in FIGS. 1, 2 and 3 and described above. As in that embodiment, the abutment member 80 is mounted for free longitudinal and rotational movement on the protruding end of cushion bar 68 and is separated from the end of the strut by a space 82. At its end within the housing 52 the nut 50 is provided with an end closure 84 which carries an abutment member 86 which is freely mounted on the end closure member 84 for engagement by the end abutment 76 on the cushion bar at the limit of inboard movement of the strut. At the inboard end of the threads 58 on the strut 62 an annular radial stop surface 88 is provided for engagement by the large abutment member 80 at the outboard limit of travel of the strut.

*Operation*

The actuator is shown in FIG. 1 of the drawings with the strut 20, 22 in its most extended position with respect to the jack-shaft. Operation of motor 2 in the proper direction of rotation will cause the jack-shaft 10 to be rotated in a direction to cause movement of the strut 22 in the inboard direction because of the threaded connection between the jack-shaft and nut 20 and the connection of the eye piece 24 to a non-rotating but movable member. When the strut reaches its fully retracted position at the limit of its inboard movement, which position is shown in FIG. 2, the abutment member 26 on the inner surface of the eye piece 24 engages the outer surface of the outer abutment 32 on the end of the cushion rod 30, compressing the rod. Any shortening of the length of the rod because of such compressive forces is permitted by the small space at 36 between the inner abutment member 34 and the end of the jack-shaft, and by the relative movement of the rod with respect to the jack-shaft which is permitted by the spline connection 44 between the two. Operation of motor 2 in the opposite direction will cause the jack-shaft to be rotated in a direction to impart outboard movement to the strut 22, and when the strut reaches the limit of such movement, which position is shown in FIG. 1, the inner surface of the inner, larger abutment member 34 on the end of the cushion rod 30 engages the stop surface 38 on nut 20, stretching the rod and putting it in tension.

It will be seen that the cushion rod will be put in either compression or tension at one or the other of the limits of movement of the strut. It is shown in tension in FIG. 1 at the most extended position of the strut, and in compression in FIG. 2 in the most retracted position of the strut. In the latter figure the rod is shown to be shortened in length by the compressive forces, the shortening being accommodated by the space 36. The cushion rod rotates with the rotating jack-shaft and with respect to the non-rotating nut 20 and strut 22, and at impact between either of the abutment members 32, 34 and abutment 26 or stop surface 38, respectively, only compressive or tensile forces, respectively, will be exerted on the cushion rod because any twisting of the rod is prevented by the spline connection between the rod and the jack-shaft. Thus, all energy expended in the cushion rod on impact at either limit of movement of the strut will be stored entirely in the small diameter-part of the rod as compression or tension energy and none will be stored as torsional energy, thus providing maximum energy storage with minimum size of cushion means. The part of the rod extending outside the end of the jack-shaft and beyond the splines 44 is short and stiff and does not participate in the storage of energy. Also by keeping the radii of the abutting surfaces 26, 32 and 34 as small as possible and using multiple surfaces 26, 32, 34 and washers 33 or 78 of materials with low friction against each other a further contribution to a non-jamming condition is made.

It is believed that the operation of the embodiment of the invention disclosed in FIG. 4 will be clear and apparent from the foregoing description of its structure and the description of operation of the embodiment of the invention disclosed in FIGS. 1, 2 and 3, and that no further explanation thereof is required.

While I have described and illustrated two forms which my invention may take, it will be apparent to those skilled in the arts to which it relates that other embodiments, as well as modifications of those disclosed, may be made and practiced without departing from the spirit or scope of the invention, for the limits of which reference must be made to the appended claims.

What is claimed is:

1. An actuator comprising a rotatable member and a linearly movable member, means for translating rotary movement of the rotatable member into linear movement of the linearly movable member to a limit of movement where impact between the two members takes place, a stress member carried by one member and having a part engageable by the other member in the region of relative movement of said members, means connecting the stress member to the member by which it is carried for movement therewith and longitudinal movement thereof but inhibiting rotational movement with respect thereto, whereby upon engagement of the stress member part with the other member the stress member will be put under compression or tension but not torsion.

2. An actuator comprising a rotatable member and a linearly movable member, a threaded connection between said members for translating rotary movement of the rotatable member into linear movement of the linearly member to a limit of movement where impact between the two members takes place, a stress member carried by one member and having a part engageable by the other member in the region of relative movement of said members, means connecting the stress member to the member by which it is carried for movement therewith and longitudinal movement thereof but inhibiting rotational movement with respect thereto, whereby upon engagement of the stress member part with the other member the stress member will be put under compression or tension but not torsion.

3. An actuator comprising a rotatable member and a linearly movable member, means for translating rotary movement of the rotatable member into linear movement of the linearly movable member to a limit of movement where impact between the two members takes place, one of said members having a longitudinal bore therein, a stress member mounted within said bore and having a part protruding from the bore for engagement by the other member in the region of relative movement of said members, means connecting the stress member to the member by which it is carried for movement therewith and longitudinal movement thereof but inhibiting rotational movement with respect thereto, whereby upon engagement of the stress member part with the other member the stress member will be put under compression or tension but not torsion.

4. An actuator comprising a rotatable member and a a linearly movable member, means for translating rotary movement of the rotatable member into linear movement of the linearly movable member to a limit of movement where impact between the two members takes place, one of said members having a longitudinal bore therein, a stress member mounted within said bore for movement with the member and having a part protruding from the bore for engagement by the other member in the region of relative movement of said members, a spline connection between the stress member and the wall of the bore inhibiting rotary movement but permitting longitudinal movement of the stress member with respect to the member by which it is carried, whereby impact between the actuator members produces storage of energy in compression or tension of the stress member.

5. An actuator comprising a rotatable member and a linearly movable member, means for translating rotation of the rotatable member into linear movement of the linearly movable member to a limit of movement where impact between the two members takes place, a stress member carried by the rotatable member and having a part engageable by the linearly movable member in the region of the limit of movement of the linearly movable member, means connecting the stress member to the member by which it is carried for movement therewith and longitudinal movement thereof but inhibiting rotational movement with respect thereto, whereby upon engagement of the stress member part with the other member of the stress member will be put under compression or tension but not torsion.

6. An actuator comprising a rotatable member and a linearly movable member, means for translating rotation of the rotatable member into linear movement of the linearly movable member to a limit of movement where impact between the two members takes place, a stress member carried by the rotatable member for rotation therewith and having a part engageable by the linearly movable member in the region of the limit of movement of the linearly movable member, a spline connection between the stress member and the rotatable member for inhibiting rotary movement but permitting longitudinal movement of the stress member with respect to the rotatable actuator member, whereby impact between the actuator members produces energy storage in the stress member in compression or tension only.

7. An actuator comprising a rotatable member and a linearly movable member, means for translating rotation of the rotatable member into linear movement of the linearly movable member to a limit of movement where impact between the two members takes place, an elongated rod carried by the rotatable member and having a part engageable by the linearly movable member in the region of the limit of movement of the linearly movable member, means connecting the rod to the rotatable member for rotation therewith and longitudinal movement with respect thereto but inhibiting rotational movement with respect thereto, whereby upon engagement of said part of the rod with the linearly movable member the rod will be put under compression or tension but not torsion.

8. An actuator comprising a hollow rotatable member and a linearly movable non-rotatable member, means for translating rotation of the rotatable member into linear movement of the linearly movable member to a limit of movement where impact between the two members takes place, a stress member mounted within the rotatable member and having a part protruding therefrom which is engageable by the linearly movable member in the region of the limit of movement of the linearly movable member, means connecting the stress member to the rotatable member for rotation therewith and longitudinal movement thereof but inhibiting rotational movement with respect thereto, whereby upon engagement of the protruding stress member part with the linearly movable member the stress member will be compressed or extended but will not be twisted.

9. An actuator comprising a rotatable externally threaded jack-shaft having a longitudinally extending bore, a non-rotatable nut member on said shaft for movement along the shaft as the jackshaft is rotated to a limit of movement where impact between the jackshaft and nut takes place, a rod mounted within the jackshaft bore and extending longitudinally of the jack-shaft and having an end protruding therefrom having a part engageable by the nut in the region of the limit of movement of the nut, the other end of the stress member being rigidly connected to the jack-shaft within the bore, means connecting the stress member to the jack-shaft within the bore permitting longitudinal movement of the stress member with respect to the jack-shaft as the stress member is elongated or shortened by tensile or compressive forces thereon but inhibiting rotation of the stress member with respect to the jack-shaft.

10. An actuator comprising a rotatable externally threaded jack-shaft having a longitudinally extending bore, a non-rotatable nut member on said shaft for movement along the shaft as the jack-shaft is rotated to a limit of movement where impact between the jack-shaft and nut takes place, a rod mounted within the jackshaft bore and extending longitudinally of the jack-shaft and having an end protruding therefrom having a part engageable by the nut in the region of the limit of movement of the nut, the other end of the stress member being rigidly connected to the jack-shaft within the bore, means connecting the stress member to the jack-shaft within the bore adjacent the protruding end thereof permitting longitudinal movement of the stress member with respect to the jack-shaft as the stress member is elongated or shortened by tensile or compressive forces thereon but inhibiting rotation of the stress member with respect to the jack-shaft.

11. An actuator comprising a rotatable externally threaded jack-shaft having a longitudinally extending bore, a non-rotatable nut member on said shaft for movement along the shaft as the jack-shaft is rotated to a limit of movement where impact between the jack-shaft and nut takes place, a rod mounted within the jack-shaft bore and extending longitudinally of the jack-shaft and having an end protruding therefrom having a part engageable by the nut in the region of the limit of movement of the nut, the other end of the stress member being rigidly connected to the jack-shaft within the bore, splines formed on the stress member and the wall of the jackshaft bore connecting the stress member to the jackshaft within the bore permitting longitudinal movement of the stress member with respect to the jack-shaft as the stress member is elongated or shortened by tensile or compressive forces thereon but inhibiting rotation of the stress member with respect to the jack-shaft.

12. An actuator comprising a rotatable member and a linearly movable member, means for translating rotation of the rotatable member into linear movement of the linearly movable member to a limit of movement where impact between the two members takes place, a stress member carried by the linearly movable member and having a part engageable by the rotatable member in the region of the limit of relative movement of said members, means connecting the stress member to the linearly movable member for linear movement therewith and longitudinal movement thereof but inhibiting rotational movement with respect thereto, whereby upon engagement of said part of the stress member with the rotatable member the stress member will be put under compression or tension but not torsion.

13. An actuator comprising a rotatable member and a linearly movable member, means for translating rotation of the rotatable member into linear movement of the linearly movable member to a limit of movement where impact between the two members takes place, a stress member carried by the linearly movable member for linear movement therewith and having a part engageable by the rotatable member in the region of the limit of relative movement of said members, a spline connection between the stress member and the linearly movable member for inhibiting rotary movement but permitting longitudinal movement of the stress member with respect to the linearly movable actuator member, whereby impact between the actuator members produces energy storage in the stress member in compression or tension only.

14. An actuator comprising a rotatable member and a linearly movable member, means for translating rotation of the rotatable member into linear movement of the linearly movable member to a limit of movement where impact between the two members takes place, an elongated rod carried by the linearly movable member and having a part engageable by the rotatable member in the region of the limit of relative movement of said members, means connecting the rod to the linearly movable member for linear movement therewith and longitudinal movement with respect thereto but inhibiting rotational movement with respect thereto, whereby upon engagement of said part of the rod with the rotatable member the rod will be put under compression or tension but not torsion.

15. An actuator comprising a hollow rotatable member and a linearly movable non-rotatable member, means for translating rotation of the rotatable member into linear movement of the linearly movable member to a limit of movement where impact between the two members takes place, a stress member mounted within the linearly movable member and having a part protruding therefrom which is engageable by the rotatable member in the region of the limit of relative movement of said members, means connecting the stress member to the linearly movable member for linear movement therewith and longitudinal movement thereof but inhibiting rotational movement with respect thereto, whereby upon engagement of the protruding stress member part with the rotatable member the stress member will be compressed or extended but will not be twisted.

16. An actuator comprising a rotatable threaded nut, a non-rotatable strut threaded to said nut for movement along the nut as the nut is rotated to a limit of movement where impact between the nut and strut takes place, the strut having a longitudinally extending bore, a rod mounted within the strut bore and extending longitudinally of the strut and having an end protruding therefrom having a part engageable by the nut in the region of the limit of relative movement of the strut and nut, the other end of the stress member being rigidly connected to the strut within the bore, means connecting the stress member to the strut within the bore permitting longitudinal movement of the stress member with respect to the strut as the stress member is elongated or shortened by tensile or compressive forces thereon but inhibiting rotation of the stress member with respect to the strut.

17. An actuator comprising a rotatable threaded nut, a non-rotatable strut threaded to said nut for movement along the nut as the nut is rotated to a limit of movement where impact between the nut and strut takes place, the strut having a longitudinally extending bore, a rod mounted within the strut bore and extending longitudinally of the strut and having an end protruding therefrom having a part engageable by the nut in the region of the limit of relative movement of the strut and nut, the other end of the stress member being rigidly connected to the strut within the bore, means connecting the stress member to the strut within the bore adjacent the protruding end thereof permitting longitudinal movement of the stress member with respect to the strut as the stress member is elongated or shortened by tensile or compressive forces thereon but inhibiting rotation of the stress member with respect to the strut.

13. An actuator comprising a rotatable threaded nut, a non-rotatable strut threaded to said nut for movement along the nut as the nut is rotated to a limit of movement where impact between the strut and nut takes place, the strut having a longitudinally extending bore, a rod mounted within the strut bore and extending longitudinally of the strut and having an end protruding therefrom having a part engageable by the nut in the region of the limit of relative movement of the strut and nut, the other end of the stress member being rigidly connected to the strut within the bore, splines formed on the stress member and the wall of the strut bore connecting the stress member to the strut within the bore permitting longitudinal movement of the stress member with respect to the strut as the stress member is elongated or shortened by tensile or compressive forces thereon but inhibiting rotation of the stress member with respect to the strut.

References Cited by the Examiner
UNITED STATES PATENTS 2,907,223  10/59  Valenti _____ 74—424.8

FOREIGN PATENTS 779,420  7/57  Great Britain.

DON A. WAITE, *Primary Examiner.*